United States Patent [19]

Tracy

[11] 3,800,211
[45] Mar. 26, 1974

[54] PARALLEL OPERATION OF PLURAL PWM INVERTERS

[75] Inventor: John Gaylord Tracy, Erie, Pa.

[73] Assignee: General Electric Company, Erie, Pa.

[22] Filed: Mar. 23, 1973

[21] Appl. No.: 344,318

[52] U.S. Cl. ............................ 321/9 A, 321/27 MS
[51] Int. Cl. ............................................. H02m 1/12
[58] Field of Search .......... 321/5, 9 A, 27 MS, 45 R

[56] References Cited
UNITED STATES PATENTS

| | | | |
|---|---|---|---|
| 3,205,424 | 9/1965 | Bates | 321/27 MS |
| 3,207,974 | 9/1965 | McMurray | 321/45 R |
| 3,278,827 | 10/1966 | Corey et al. | 321/27 MS |
| 3,297,936 | 1/1967 | Ruch | 321/27 MS |
| 3,390,322 | 6/1968 | Rogers | 321/27 MS |
| 3,381,205 | 4/1968 | Howell et al. | 321/27 MS |
| 3,571,692 | 3/1971 | Andren | 321/27 MS X |
| 3,671,846 | 6/1972 | Corey | 321/9 A |
| 3,694,718 | 9/1972 | Graf et al. | 321/5 X |
| 3,715,649 | 2/1973 | Ravas | 321/9 A |

Primary Examiner—William M. Shoop, Jr.
Attorney, Agent, or Firm—Arnold E. Renner; Harold H. Green, Jr.

[57] ABSTRACT

An adjustable dc to ac power conversion apparatus or inverter system employing a plurality of pulse width modulation inverter circuits in parallel are provided with means to vary the time ratio during which the inverter circuits are conductive and are further provided with means to adjust the phase relationship between each of the inverter circuits such that with a step variation in the time ratio there is additionally provided an adjustment of the phase relationship between the inverter circuits to minimize any resultant phase shift in the system output.

9 Claims, 7 Drawing Figures

PARALLEL OPERATION OF PLURAL PWM INVERTERS

BACKGROUND OF THE INVENTION

The present invention relates generally to dc to ac conversion circuits, more commonly known as inverters, and more particularly to the paralleling of inverters of the pulse width modulation type for the supplying of variable voltage and/or frequency power to a suitable load, such as a motor, from a dc source.

Inverter circuits generally are well known in the art. Such circuits normally employ suitable electronic switching means such as thyristors for converting dc power to ac power. One example of a well known inverter circuit may be found in U.S. Pat. No. 3,207,974 to W. McMurray entitled "Inverter Circuits".

It is also known in the art that the effective output voltage of an inverter circuit may be varied by adjusting the percentage of time that the switches (hereinafter referred to as thyristors) are conductive and that one way of achieving this change in percentage is by pulse width modulation (PWM); ie each half cycle of the basic frequency at which the inverter is operating is divided into a series of pulses, preferably square wave pulses, the widths of which are varied to vary the effective voltage. This is commonly known as chopping. An example of such a PWM inverter may be found in U.S. Pat. No. 3,694,718 to C. E. Graf et al entitled "Methods of Inverter Voltage Control by Superimposed Chopping".

It is further known in the art that two or more inverter circuits, either single phase or polyphase, may be paralleled to increase the amount of power which can be supplied to a load such as a motor. Prior attempts to parallel PWM inverters have, however, not been entirely satisfactory in that the preferred relationship between the individual pulses in the fundamental frequency half cycles of the inverter circuits has not been obtained and undesirable harmonics are present in the power as applied to the load. In the case of a motor load, which is perhaps the most common use for inverter circuits, these harmonics result in undesirable heating. In the case of paralleling two inverter circuits, the preferred relationship between individual pulses or "chops" is that the chop of the second shall fall midway between the "chops" of the first. In the case of paralleling three inverter circuits, the "chops" of each of the several inverters would be equally spaced within the cycle period. When the ratio of the chopping frequency makes a step change, transients can appear in the power applied to the load if the relative phase relationship of the inverter outputs is not maintained such that a substantially zero phase shift is seen by the load.

SUMMARY OF THE INVENTION

The problems of the prior art systems are minimized by the present invention which provides for the paralleling of two or more PWM inverter circuits each of which is "chopped" at varying frequencies to permit average voltage adjustment and to maintain a chopping frequency which is practical for the switching devices employed. The present invention further provides that as the ratio of chopping frequency to fundamental frequency changes, the several inverters are phase shifted with respect to one another such that there will exist no shift in phase in the system output as supplied to load.

BRIEF DESCRIPTION OF THE DRAWING

For a better understanding of the present invention reference is made to the accompanying drawing in which.

DESCRIPTIONS OF THE PREFERRED EMBODIMENT

Figure 1:
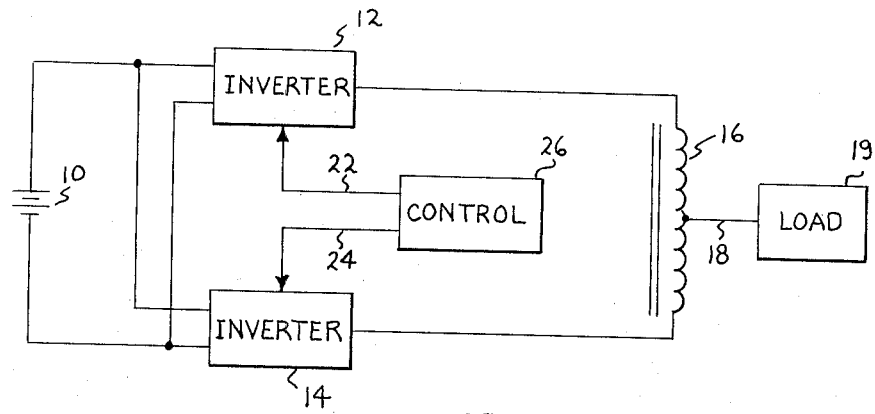
FIG. 1 is a schematic diagram, largely in block form, illustrating the paralleling of two inverters as applicable to the present invention.

Referring first to FIG. 1, there is shown the present invention in block form including a source of constant potential illustrated as a battery 10. Connected across the terminals of the battery are two inverter circuits 12 and 14 which may be of the type described in the aforementioned U.S. Pat. No. 3,207,974. The inverters 12 and 14 are paralleled by the connection of their respective outputs to a transformer 16 which is provided with a center tap 18 to which there is connected a load 19. A control means 20 in accordance with the present invention is provided with an output 22 to inverter 12 and a second output 24 to inverter 14 to control the operations of those inverters. The mode of operation of the inverter circuit of the present invention is generally of the pulse width modulated type such as is described in U.S. Pat. No. 3,694,718. The control 20 of FIG. 1 is shown in greater detail in FIG. 2 and is similar in many respects to that shown and described in detail in U.S. Pat. No. 3,694,718.

Figure 2:
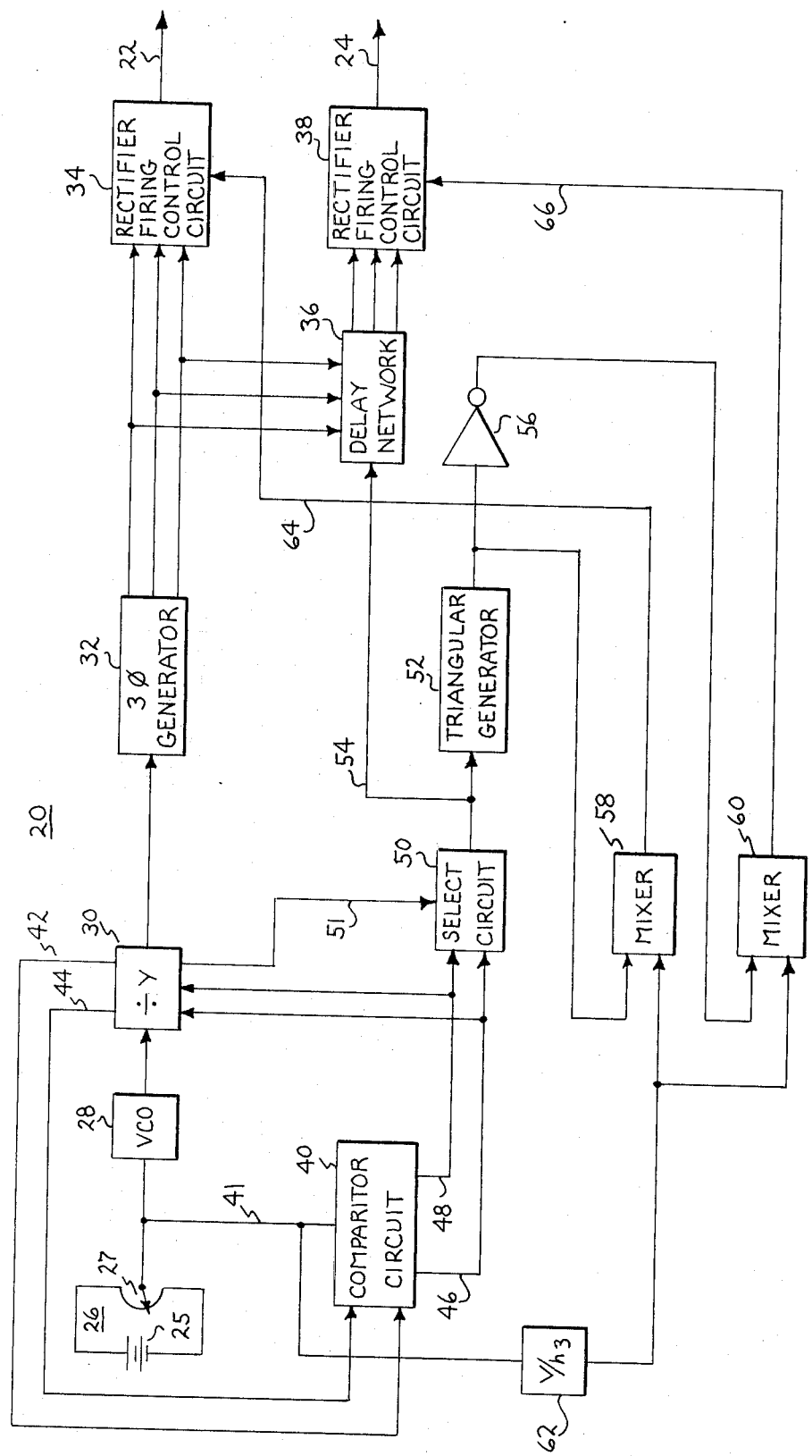
FIG. 2 is a block diagram showing in detail the control block of FIG. 1.

Referring now to FIG. 2, the control 20 includes as a reference setting device 26 including a battery 25 across which is connected a potentiometer 27, the setting of which will provide a voltage, in accordance with the desired operating parameters of the system, to a voltage controlled oscillator 28. The oscillator 28 provides, an output to a "divide by Y" circuit 30, a train of pulses the frequency of which is a function of the input voltage from potentiometer 27. The output of the divide by Y circuit 30 is supplied to a three phase generator 32 which provides a three phase output to a rectifier firing control circuit 34 the output of which is the signal on line 22. The three phase generator 32 and the rectifier firing control circuit 34 are described in greater detail in the aforementioned U.S. Pat. No. 3,694,718. The three outputs from the three phase generator 32 are also provided in parallel to a delay network 36, which will be explained in greater detail hereinafter. The network 36 provides a three phase delayed output to a second rectifier firing control circuit 38 similar to that shown at 34, the output of which is the signal on line 24.

The output of potentiometer 27 also forms an input to a comparitor circuit 40, and a "volts per hertz" compensating network 62. The comparitor circuit 40 also receives two clock signals by means of two lines 42 and 44 from the divide by Y circuit 30 as will be further explained. The output of the comparitor circuit 40, on lines 46 and 48 form inputs to a select circuit 50 and to the divide by Y circuit 30. The comparitor circuit 40, is comprised of two voltage comparitors such as are known in the art and which are so arranged such that when the voltage appearing on line 41 is below a first predetermined value, the outputs on lines 46 and 48 will both be a binary one. When the voltage on line 41 exceeds a first predetermined value, line 46 will remain a binary one and line 48 will go to binary 0. When the input on line 41 exceeds a second, higher predetermined value, the signals on the two lines 46 and 48 will both be a binary 0.

The select circuit 50 also receives an input via line 51 from the divide by Y circuit 30. This line is actually a bus of three lines and will have a signal, respectively, on each of the lines representing the functions of divide by 2, divide by 4, and divide by 8. The particular signal selected from bus 51 is a function of the signals on lines 46 and 48 such that if the voltage is low and the lines 46 and 48 both have a binary one, the divide by 2 signal is the output of select circuit 50. In a similar manner if the voltage is of a middle range such that the lines 46 and 48 are 1 and 0 respectively, the divide by 4 signal from bus 51 is used. If the voltage is high, the divide by 8 signal is selected from bus 51.

The output of the select circuit 50 forms an input to a delay network 36 as will be explained in greater detail with respect to FIG. 3 and also serves as an input to a triangular generator 52, the output of which is a triangular wave having a frequency the same as that from the select circuit 50.

The output of the triangular generator 52 forms one input to a first mixer circuit 58 the second input of which is from the voltage per hertz compensation network 62 to provide an output signal from the mixer on line 64 to the rectifier firing control circuit 34 to control the time ratio of rectifier firing within the inverter as is more fully explained in the aforementioned U.S. Pat. No. 3,694,718. The output of the triangular generator 52 is also fed to an inverting amplifier 56, the output of which forms an input to a second mixer 60, also having an input from the voltage per hertz circuit 62, such that the output of mixers 58 and 60 are essentially 180° out of phase. The output of mixer 60 on line 66 forms a control input to the rectifier firing control circuit 38.

Figure 3:
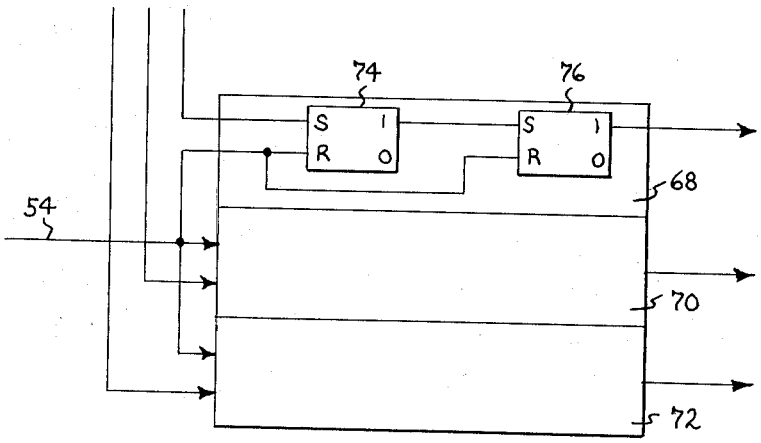
FIG. 3 illustrates in greater detail one of the elements of FIG. 2.

FIG. 3 illustrates in greater detail the delay network 36 shown in FIG. 2. The delay network 36 is comprised of three sections 68, 70 and 72, which are identical and of which only 68 is shown in detail. In that figure it is seen that section 68 is comprised of two flip-flops 74 and 76. Each of the two flip-flops includes Set (S) and Reset (R) input terminals and 1 and 0 output terminals. The first flip-flop 74 receives at its S input terminal one of the signals from the three phase generator 32. Its R input terminal receives the clocking signal on line 54 from the select circuit 50. The one output terminal of flip-flop 74, forms an input to the S input of the flip-flop 76 while the R terminal of flip-flop 76 also receives the signal on line 54. The one output of the flip-flop 76 forms an input to the rectifier firing control 38, as is shown in FIG. 2.

Figure 4:
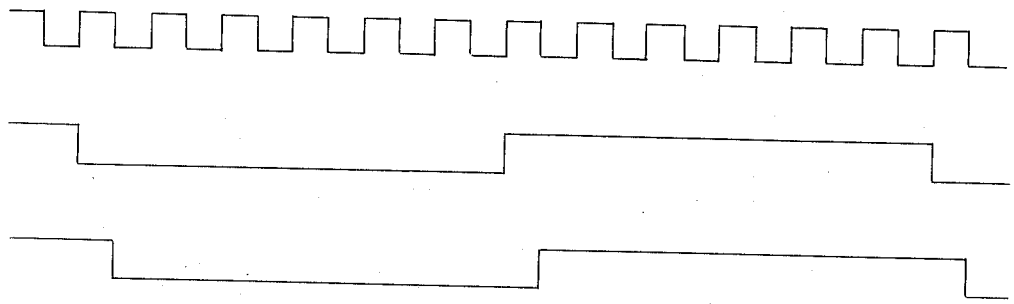
FIG. 4 shows wave shapes helpful in understanding the operation of the circuit of FIG. 3.

FIG. 4 illustrates wave shapes which are indicative of the operation of the delay network 36. Shown in the upper graph of FIG. 4, is a square wave input representing the clocking signal appearing on line 54. The middle graph of FIG. 4, is the input applied from the three phase generator 32 to the S input terminal of flip-flop 74. The output from the one terminal of flip-flop 76 is illustrated at the bottom of FIG. 4, and it is seen that the output is essentially the same as the input from the generator 32 except that it is delayed an amount equal to one-half of the period of the input clock on line 54.

Figures 5, 6:
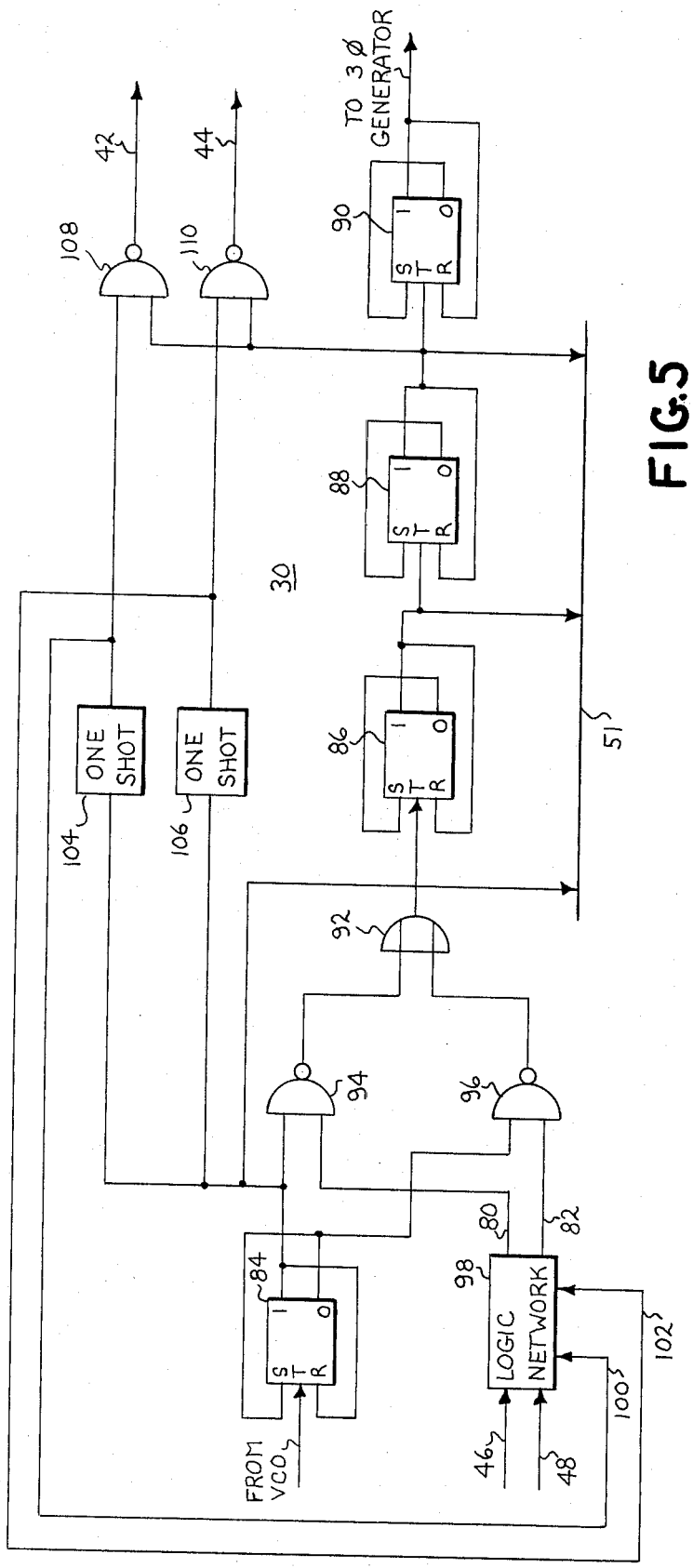
FIG. 5 is detail showing of another element shown in block form in FIG. 2 and illustrates the circuitry which provides the desired phase shifting between inverters in accordance with the present invention.
FIG. 6 is a truth table applicable to an element shown in FIG. 5.

The details of the divide by Y circuit 30 and the manner in which the present invention is accomplished is best seen with respect to FIG. 5. FIG. 5 includes four triggered flip-flops 84, 86, 88 and 90, each including as well S and the R input terminals, a T input terminal. Each of the flip-flops 84 thru 90 has its output tied back upon its inputs such that with the application of a signal to the T or trigger input terminal, the flip-flop will change its state. The output of the last flip-flop 90 is provided to the three phase generator 32, as shown in FIG. 2. The trigger input to the flip-flop 90 is from the 1 output of flip-flop 88 and in a similar manner the trigger input to flip-flop 88 is the 1 output of flip-flop 86. The input to the trigger terminal of flip-flop 86 is the output of an OR gate 92, the two inputs of which are from a pair of NAND gates 94 and 96. One input to the NAND gate 94 is from the 1 output terminal of flip-flop 84 and in a similar manner one input to the NAND gate 96 is from the 0 output terminal of the flip-flop 84. The input to the trigger terminal of flip-flop 84 is the signal from the voltage control oscillator 28 as shown in FIG. 2. Each of the NAND gates 94 and 96, has as a second input respectively the signals on lines 80 and 82 from a logic network 98. Two of the inputs to the logic network are the signals on lines 46 and 48 from the comparitor circuit 40 shown in FIG. 2. Two additional inputs to the logic network 98 are via lines 100 and 102 derived respectively from the outputs of two one shots 104 and 106. The two one shots, 104 and 106 both receive as an input the signal from the 1 output terminal of flip-flop 84. They differ, however, in that one will trigger on the leading edge of the pulse while the second will trigger on the trailing edge of the pulse. For sake of this example, it will be assumed that one shot 104 triggers on the leading edge and one shot 106 triggers on the trailing edge. The outputs of the one shots 104 and 106 form, respectively, the inputs to two NAND gates 108 and 110. The other input to each of these NAND gates is the signal on the one output terminal of flip-flop 88.

The outputs of NAND gates 108 and 110 are respectively the signals applied via lines 42 and 44 to the comparitor circuit 40 of FIG. 2 and provide the timing signals for that circuit. A signal on line 42 is necessary to permit the first comparitor to provide an output on line 48 indicative of the reaching of the first predetermined voltage on the input from the rheostat 27. In a similar manner a binary 1 signal on line 44 is required and acts as a timing signal to permit the second comparitor within in the circuit 40 to provide an output signal indicative of the input signal having reached a second predetermined magnitude. This output signal is provided on line 46.

FIG. 6 is a truth table setting forth the relationship between the signals appearing on lines 46 and 48 from the comparitor circuit 40 and the outputs 80 and 82 from the logic network 98. In that table it is seen, starting at the bottom, that with a low voltage being applied to the comparitor circuit both 46 and 48 have a 1 output and line 80 is a binary 1 while line 82 is a binary 0. Similarly, if a mid-range voltage is applied to the comparitor circuit 40, 46 will be a 1 and 48 will be a 0 resulting in signals of 0 and 1 respectively on lines 80 and 82. A high range voltage will place lines 46 and 48 both in the binary 0 state and the lines 80 and 82 will be 1 and 0.

Figure 7:
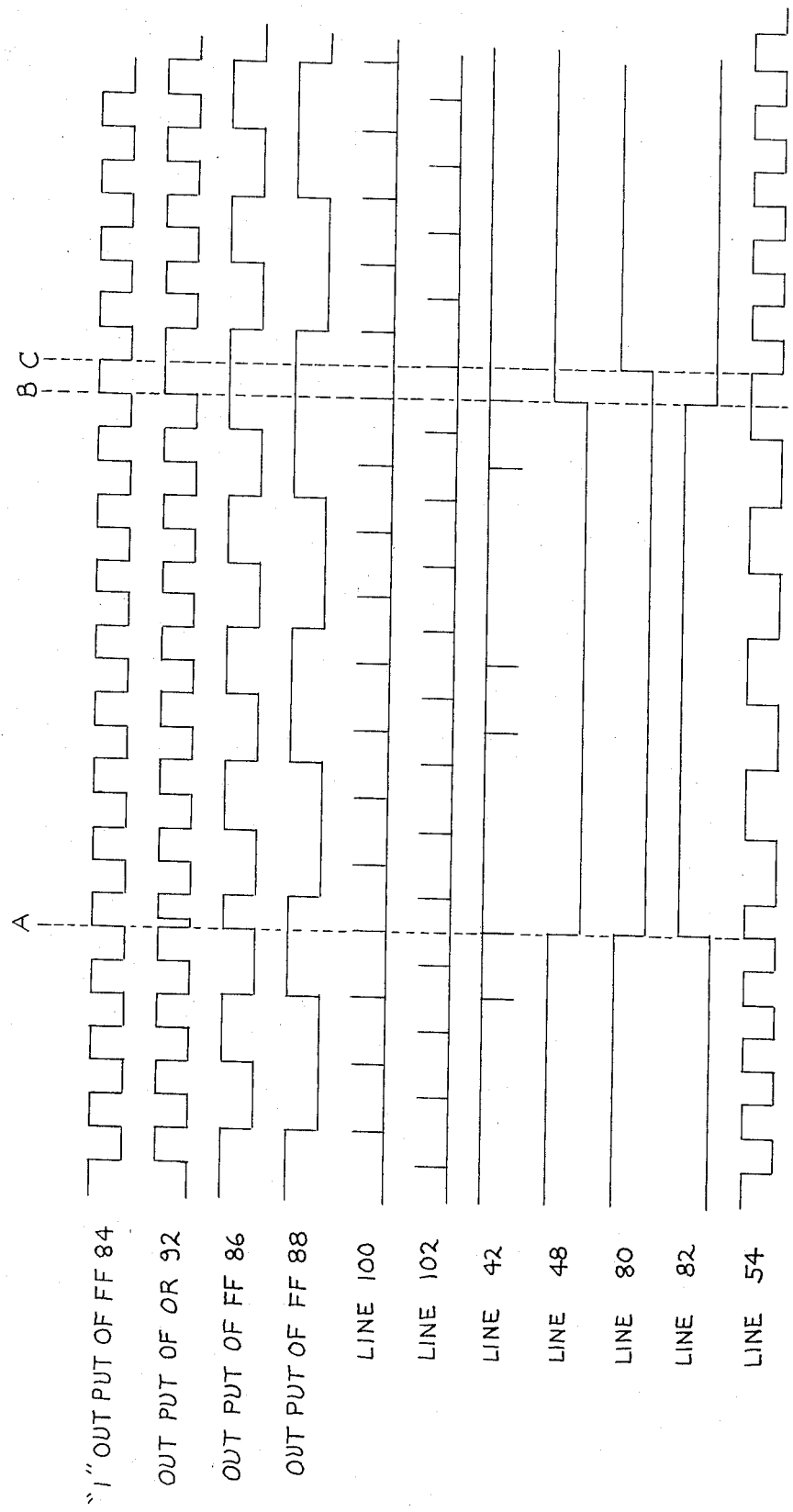
FIG. 7 includes waveshapes, drawn to the same time base, of the signals present at several points within the circuitry of the present invention which are useful in the understanding of the operation of the present invention.

The method of operation of the present invention may best be understood with respect to the timing diagram of FIG. 7, taken in conjunction with the circuitry of the divide by Y circuit shown in FIG. 5. The upper graph of FIG. 7 is labeled "1" Output of FF84 and is shown to be square wave which will have a frequency one-half of that supplied to its T input terminal which comes from the voltage controlled oscillator. It will be assumed for purposes of this illustration that, as is shown in FIG. 7, by the graph marked "Line 48", that line 48 had a binary 1 and that at this time line 80 is also a binary 1 while 82 will be a binary 0. In this situation, as is illustrated in the second graph of FIG. 7 labeled "Output of OR 92", the output of the OR gate 92 will be the inverse of the NAND 94. The output of the OR gate 92, of course, is applied to the flip-flop 86 and the output of that flip-flop is in turn applied to 88. As is shown in FIG. 7, these graphs essentially provide a divide by 2 cascaded division of the input signal from the oscillator 28. It is also seen in FIG. 7 that there appears on line 100 a pulse which occurs at the leading edge of each output of the flip-flop 84 and that on line 102 there appears a pulse which occurs at the trailing edge of each output of flip-flop 84. Also shown in FIG. 7 is the signal on line 42 which is the NAND function of the signals on line 100 and the one output of flip-flop 88. The previously mentioned line 48 signal which is derived from the comparitor circuit 40 as shown in FIG. 2, is clocked by the occurrence of a pulse on line 42 as was previously indicated.

Referring again to FIG. 2, previous mention was made of a bus 51 which provides the divide by 2, the divide by 4 and the divide by 8 signals. As shown in FIG. 5, these signals are taken respectively from the 1 terminal outputs flip-flops 84, 86 and 88. It will be assumed that the voltage on line 41 is increasing such that it exceeds a first predetermined value as originally described and that line 48 will thus change its state from a binary 1 to a binary 0 upon the occurrence of the clock pulse on line 42. With the change of state of the comparitor within the circuit 40, and the change of state on line 48, the select circuit 50 would be caused to select a different chopping frequency or division number. In the present example it would select the output of flip-flop 86 as opposed to flip-flop 84, that is, it would be dividing by a 4 rather than dividing by 2. This is illustrated in that graph labeled "Line 54" in FIG. 7. This change in chopping frequency is applied equally to both the rectifier firing control circuits 34 and 38 through the triangular generator, mixer circuits, etc. Because the signal on line 54 is now at one half the frequency with respect to what the frequency had been prior to the change, the effect of line 54 as a clocking signal to the delay network 36 is to delay the operation of the rectifier firing circuit 38 with respect to the rectifier firing circuit 34 twice as much as prior to the change. Without the benefit of the present invention, this step change in delay between the two circuits 34 and 38 would cause an undesirable transient to the load. To alleviate this undesirable result, the present invention provides that the outputs of the two rectifier firing control circuits 34 and 38, are shifted in time an equal amount in opposite direction relative to one another, such that the overall result is a 0 shift in time in the output of the inverter circuits themselves. Hence, the load would see no change which could result in undesirable transients.

Referring once again to FIG. 7, this shifting occurs at point A when line 48 changes its state. When the signal on line 48 goes from binary 1 to a binary 0, lines 80 and 82 each change state as shown in FIG. 5, the NAND gates 94 and 96 will now reverse their previous status and the output of the OR gate 92 becomes the output of NAND gate 96, taken from the 0 output terminal of the flip-flop 84. As shown in the "output of OR 92" graph of FIG. 7, this results in a second pulse which is in very close proximity to the one immediately preceeding (time A) and results in a shifting to the left of the subsequent flip-flops within the circuit 30. As shown in FIG. 2, the output of the circuit 30 is applied to the three phase generator 32 and the resultant shift would be carried into that generator, such that it is shifted to the left or earlier in time a like amount. The output of the generator 32 is applied to the rectifier firing circuit 34 and through the delay 36 to the rectifier firing control circuit 38. With the generator 32 operating earlier in time, coincident with an increase in the delay through 36, the control circuit 34 will fire earlier in time while the control circuit 38 will fire later in time. This combination results in the desired function that the output of the inverter circuits, as seen by the load, sees no change.

At point B, as shown in FIG. 7, the voltage applied to the comparitor circuit 40 of FIG. 2 is assumed to decrease such that the comparitor providing the signal to line 48 once more assumes a binary 1 state. The signal now appearing on line 82 will change immediately whereas the signal change on line 80 is delayed until there appears a clock pulse on line 102 in the manner previously described. It is seen that the signal on line 54 reverts to its original frequency, that of the output of the flip-flop 84, and the resultant is that the output of OR gate 92 is once more made a function of the output of NAND gate 94. The shift in the signal to the flip-flop 86 is to the right or delayed in time. As was earlier explained and in a similar manner this shift is carried through the remaining flip-flops of the divide by Y circuit 30 into the three phase generator 32 and from thence to the two rectifier firing control circuits 34 and 38. The control circuits 34 and 38 will now be shifted closer together, that is, the rectifier firing control circuit 34 will be fired later in time, while the control circuit 38 will provide pulses earlier in time and the result as seen by the load is once again a zero shift in phase.

A similar analysis can be made for the output of the second comparitor of the comparitor circuit 40 as relating to the output on line 46 and which is under control of the clock pulse appearing on line 44. Such an analysis would follow the same general pattern and is believed unnecessary for the full understanding of the present invention.

Thus it is seen that there has been shown and described an improved system for the parallel operation of pulse width modulated inverters which system automatically compensates or adjusts itself in response to desirable step variations in the chopping frequency to provide an output which is phase shifted to be lower in harmonics and free from transients and which represents to the load an input which has no change in phase relationship upon the execution of step variations.

While there has been shown and described what is at present considered to be the preferred embodiment of the invention, the appended claims are not intended to be limited thereto but are intended to include all within the true meaning and scope of the invention. For example, while only two inverters in parallel have been shown, it is obvious that a greater number could be paralleled by properly proportioning the delaying of each of the inverters. In addition, while three chopping ranges were illustrated a greater or lesser number could be used and the relationship between the several chopping frequencies could be other than binary.

What is claimed is:

1. An adjustable dc to ac power conversion system comprising:
   a. a plurality of inverter circuits each operable in a pulse width modulation mode;
   b. means to connect said inverter circuits in parallel to supply power to a common load; and
   c. control means for time ratio controlling the power supplied to the load from each of said inverter circuits, said control means including means responsive to a stepped variation in the time ratio control of said inverters for adjusting the phase relationship there-between whereby there is substantially no phase shift in said power supplied to the load and harmonics in said load are minimized.

2. An adjustable dc to ac power conversion system comprising:
   a. a plurality of inverter circuits connected in parallel with respect to a common load, each of said inverter circuits operable in a pulse width modulation mode;
   b. control means for time ratio controlling each of said inverters, said control means including means for operating each of said inverter circuits at a desired frequency to give a prescribed output;
   c. means operative to pulse width modulate said output at a frequency which is a prescribed multiple of said desired frequency;
   d. means to determine said multiple;
   e. means to phase displace the outputs of each of said inverters; and,
   f. means to effect step changes in the phase displacement of the inverter outputs coincident with a change in said multiple.

3. The invention in accordance with claim 1 wherein said load is an ac motor.

4. The invention in accordance with claim 2 wherein the number of inverter circuits paralleled is two.

5. The invention in accordance with claim 2 wherein the multiple is a multiple of six.

6. The invention in accordance with claim 2 wherein said last mentioned means includes: means to sense the requirement of a change in the multiple and to provide an output signal indicative thereof; means responsive to said output signal to effect the change to the new multiple; and, means responsive to the new multiple to effect the step change in phase displacement.

7. The invention in accordance with claim 6 wherein the last recited means includes a delay circuit.

8. The invention in accordance with claim 2 wherein there is further included means for insuring that the step changes in phase displacement occur by shifting one inverter to earlier in time and by shifting the second inverter to later in time.

9. The invention in accordance with claim 8 wherein each inverter is shifted an equal amount.

* * * * *

UNITED STATES PATENT OFFICE
CERTIFICATE OF CORRECTION

PATENT NO. : 3,800,211
DATED : March 26, 1974
INVENTOR(S) : John Gaylord Tracy

It is certified that error appears in the above-identified patent and that said Letters Patent are hereby corrected as shown below:

Page 1, Abstract Page, In the drawing, block 40, cancel "COMPARITOR" and substitute --COMPARATOR--.
In the drawing, Sheet 1, Fig. 1, change reference character "26" to --20--.
In the drawing, Sheet 2, Fig. 2, block 40, cancel "COMPARITOR" and substitute --COMPARATOR--.
In the drawing, arrowheads should be added as follows:
    Sheet 2, Fig. 2: a) to that line entering block 28 from the left; b) to that line entering block 40 from the top; and, c) to that line entering block 62 from the top.
    Sheet 3, Fig. 5: a) to that line entering block 104 from the left; b) to that line entering block 106 from the left; c) to that line applied to "T" of block 88; d) to that line applied to "T" of block 90.
Column 2, line 54, after "vides" insert --as--.
Column 3, lines 4, 5, 8, 10, cancel "comparitor" and substitute --comparator--.
    line 11, cancel "comparitors" and substitute --comparators--.
    line 12, cancel "so".
Column 4, line 20, after "well" insert --as--.
    line 37, cancel "control" and substitute --controlled--.
    line 39, insert a comma (,) before and after "respectively".
    lines 42, 59, cancel "paritor" and substitute --parator--.

lines 61, 65, cancel "comparitor" and substitute --comparator--
Column 5, lines 5, 8, 43, 56, cancel "comparitor" and substitute --comparator--.
    line 11, cancel "paritor" and substitute --parator--.
Column 6, line 33, after "ing" insert --control--.
    lines 42, 43, 65 (both instances), cancel "comparitor" and substitute --comparator--.
Column 7, line 31, after "and" insert a comma (,).

Signed and Sealed this

Third Day of August 1976

[SEAL]

Attest:

RUTH C. MASON
Attesting Officer

C. MARSHALL DANN
Commissioner of Patents and Trademarks